United States Patent
Honda (10) Patent No.: US 7,424,648 B2
(45) Date of Patent: Sep. 9, 2008

(54) NONVOLATILE MEMORY SYSTEM, NONVOLATILE MEMORY DEVICE, DATA READ METHOD, AND DATA READ PROGRAM

(75) Inventor: Toshiyuki Honda, Kadoma (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 440 days.

(21) Appl. No.: 11/370,233

(22) Filed: Mar. 8, 2006

(65) Prior Publication Data

US 2006/0206751 A1 Sep. 14, 2006

(30) Foreign Application Priority Data

Mar. 10, 2005 (JP) .............................. 2005-067251

(51) Int. Cl.
*G06F 11/00* (2006.01)
(52) U.S. Cl. ........................................................ 714/52
(58) Field of Classification Search .................. 714/52, 714/54, 57, 48, 42, 39, 27, 30
See application file for complete search history.

(56) References Cited

U.S. PATENT DOCUMENTS

| | | | | |
|---|---|---|---|---|
| 6,122,195 A | * | 9/2000 | Estakhri et al. | 365/185.11 |
| 6,351,412 B1 | * | 2/2002 | Nozoe et al. | 365/185.09 |
| 6,549,460 B2 | * | 4/2003 | Nozoe et al. | 365/185.09 |
| 7,012,845 B2 | * | 3/2006 | Kozakai et al. | 365/200 |
| 7,231,580 B2 | | 6/2007 | Shiota et al. | |
| 2004/0133838 A1 | * | 7/2004 | Ito | 714/766 |
| 2007/0214395 A1 | | 9/2007 | Shiota et al. | |

FOREIGN PATENT DOCUMENTS

| | | |
|---|---|---|
| CN | 1530836 A | 9/2004 |
| JP | 2003-316661 A | 11/2003 |

* cited by examiner

*Primary Examiner*—Nadeem Iqbal
(74) *Attorney, Agent, or Firm*—Smith Patent Office (57) ABSTRACT

A nonvolatile memory device has a controller and flash memory. The flash memory stores user data and an error correcting code for correcting an error in the user data. When there is a read command from the outside, the user data and error correcting code are read from the flash memory. If there is any correctable error in the read user data, error correction is performed and then the data is outputted. If the there is uncorrectable error, the data is outputted directly without any correction.

12 Claims, 9 Drawing Sheets

NONVOLATILE MEMORY SYSTEM, NONVOLATILE MEMORY DEVICE, DATA READ METHOD, AND DATA READ PROGRAM

BACKGROUND OF THE INVENTION

1. Field of the Invention

The present invention relates to a nonvolatile memory system, nonvolatile memory device, data read method, and data read program thereof that are featured in data reading from the nonvolatile memory device especially when a written file is damaged due to errors such as data retention failure or the like.

2. Discussion of the Related Arts

In recent years, a nonvolatile memory device loading a nonvolatile memory has been expanding its market as a memory card for a digital camera and a cellular phone. Then following an increase in the storage capacity of the memory card, its application has been expanding from recording of, for example, a data file, still image, or the like, which requires a small capacity, to recording of a motion picture, which requires large capacity.

However, a NAND type flash memory mainly used as a nonvolatile memory of the memory card essentially has a possibility of a data retention error. Thus, data to be recorded is provided with an error correcting code (hereinafter, also referred to as ECC) and written into the flash memory, and also data correction is performed based on the error correcting code at the time of reading, thereby ensuring the data in the event of a data retention error.

SUMMARY OF THE INVENTION

However, when a data retention error that cannot be supported by the correction capability of the ECC occurs, data correction cannot be performed. The memory card does not output only a bit to which an error has occurred but also data in a management unit including a bit that appears to be incorrect. In this case, the data is consequently lost in the management unit including the bit. Thus, when a nonvolatile memory is used for data recording in the digital camera, a part of data of a precious still image or motion picture deliberately taken by the user becomes greatly damaged, or the data itself becomes lost. However, in practice, even when the error occurs in some bits of data of the still image or motion picture, the image substantially close to the original still image can be obtained in many cases, and, in the case of the motion picture, only a flash disturbance in the motion picture occurs in many cases. Thus, compared to the case where data itself is lost, it seems significant to read even data having a bit error.

When the number of bits, to which the error is occurring, of a data retention block of the nonvolatile memory device is larger than the number of bits treated by the error correction capability supported by the nonvolatile memory device, there is a problem that the data cannot be read in a unit of a block of the data including a bit with to the error has occurred.

To solve the problem, a nonvolatile memory system of the present invention is a nonvolatile memory system comprising a nonvolatile memory device, and an access device that accesses said nonvolatile memory device to read user data in the nonvolatile memory device, wherein said nonvolatile memory device includes: a nonvolatile memory including a user data area into which user data are written and a management area which stores an error correcting code for performing error correction on the data written in said user data area; and a controller including an error correction circuit for correcting an error in user data read from said nonvolatile memory based on the error correcting code stored in said management area, which includes: an error correction read in which user data is read from said nonvolatile memory and the error correction is performed with the use of said error correction circuit if there is any error while the data is directly read if there is no error; and a raw data read in which the user data read from said nonvolatile memory is directly outputted without any correction, and wherein said access device reads user data in combination with said error correction read and said raw data read from the nonvolatile memory device.

To solve the problem, a nonvolatile memory device of the present invention is a nonvolatile memory device comprising: a nonvolatile memory having a user data area into which user data is written and a management area which stores error correcting code for performing an error correction on data written in said user data area; and a controller including an error correction circuit for correcting error in user data read from said nonvolatile memory based on said error correcting code, wherein said controller comprises: a normal read mode wherein data in the user data area is directly outputted if there is no error, the error in the data in the user data area is corrected and then outputted, if there is any correctable error, and data is not outputted if there is any uncorrectable error; and a special read mode wherein data in the user data area is outputted directly if there is no error, the error in the data in the user data area is corrected and then outputted, if there is any correctable error, and data in the user data area is directly outputted without any correction if there is any uncorrectable error.

To solve the problem, a data read method of the present invention is a data read method for reading user data from a nonvolatile memory device comprising: a nonvolatile memory having a user data area into which the user data is written and a management area which stores error correcting code for performing an error correction on the data written in said user data area; and a controller including an error correction circuit for correcting error in user data read from said nonvolatile memory based on the error correcting code stored in said management area, comprising: reading user data from said nonvolatile memory; determining presence or absence of the error in the user data read from the nonvolatile memory; directly outputting data if there is no error in the user data; outputting data after subjecting the data to the error correction with the use of said error correction circuit if there is any error; and directly outputting user data read from said nonvolatile memory without any correction if the error cannot be corrected with the use of said error correction circuit.

To solve the problem, a data read program of the present invention is a data read program for reading user data from a nonvolatile memory device including: a nonvolatile memory having a user data area into which the user data is written and a management area which stores error correcting codes for performing an error correction on the data written in said user data area; and a controller including an error correction circuit for correcting errors in the user data read from said nonvolatile memory based on the error correcting code stored in said management area, comprising: reading user data with the use of a normal read mode in which said controller corrects the error in the user data read from said nonvolatile memory with the use of said error correction circuit and outputs the data to an outside of said nonvolatile memory device, and reading user data with the use of an ECC-off read in which said controller directly outputs the user data read from said nonvolatile memory to an outside of said nonvolatile memory device without the use of said error correction circuit, when the error which cannot be corrected by said error correction circuit occurs in said nonvolatile memory and it is judged that the reading cannot be achieved by said normal read mode.

To solve the problem, a data read program of the present invention is a data read program for reading user data from the nonvolatile memory device including: a nonvolatile memory having a user data area into which the user data is written and a management area which stores error correcting codes for performing an error correction on the data written in said user data area; and a controller including an error correction circuit for correcting errors in user data read from said nonvolatile memory based on the error correcting code stored in said management area, comprising: reading user data from said nonvolatile memory by a special read which outputs: user data from said nonvolatile memory after correcting the user data when an error in user data is correctable; and row data read from said nonvolatile memory when the error is not correctable.

With a nonvolatile memory system, nonvolatile memory device, and data read method and data read program thereof according to the present invention, even when an error which cannot be supported by the error correcting capability provided to the nonvolatile memory device occurs in the nonvolatile memory device and when data cannot be read by correcting the error, performing reading without use of error correction permits data reading from the nonvolatile memory device, so that the data can be read in a complete or incomplete form.

DESCRIPTION OF THE PREFERRED EMBODIMENTS

First Embodiment

Figure 1:
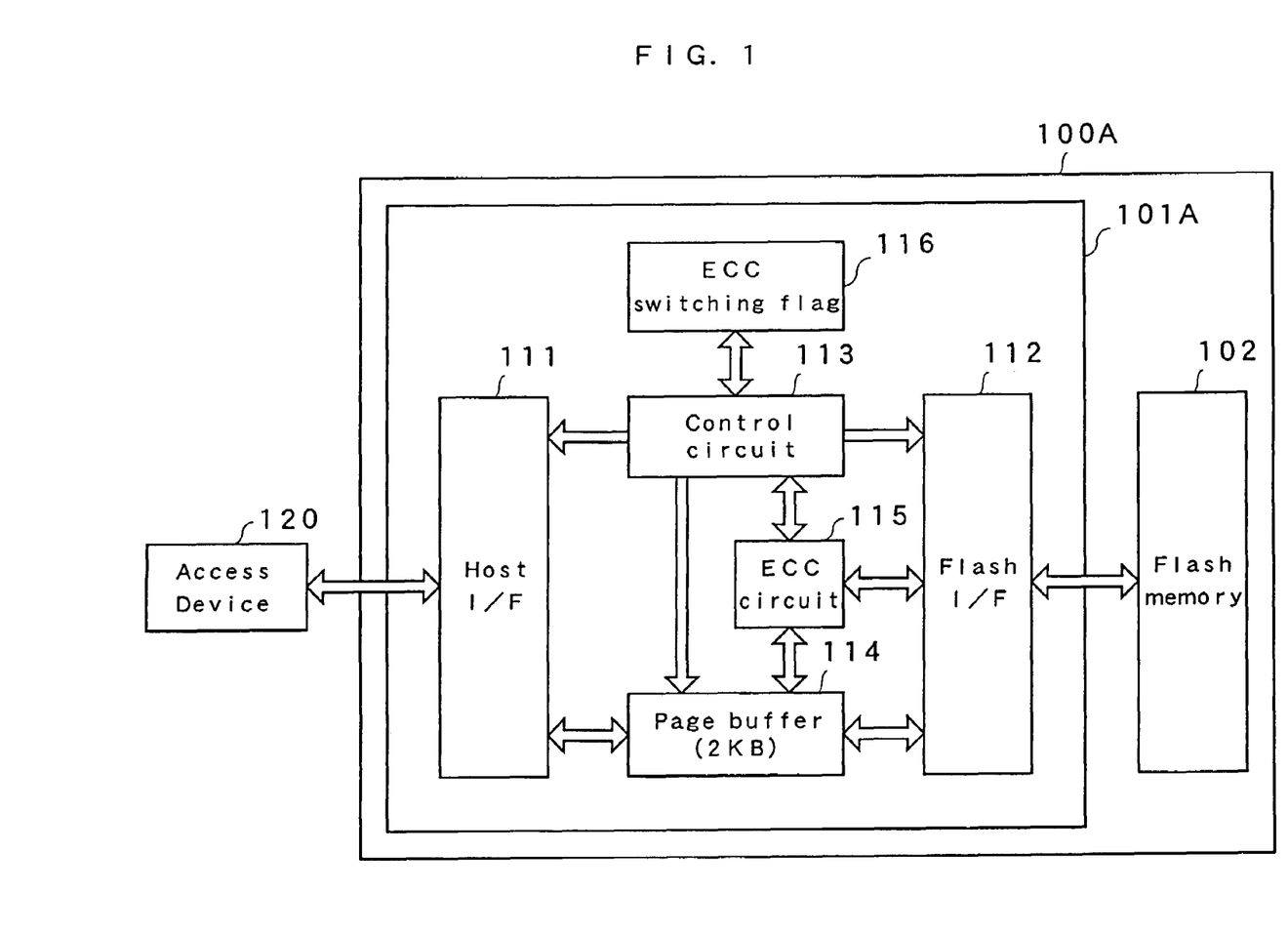
FIG. 1 is a block diagram of a nonvolatile memory device in a first embodiment of the present invention.
Figure 2:
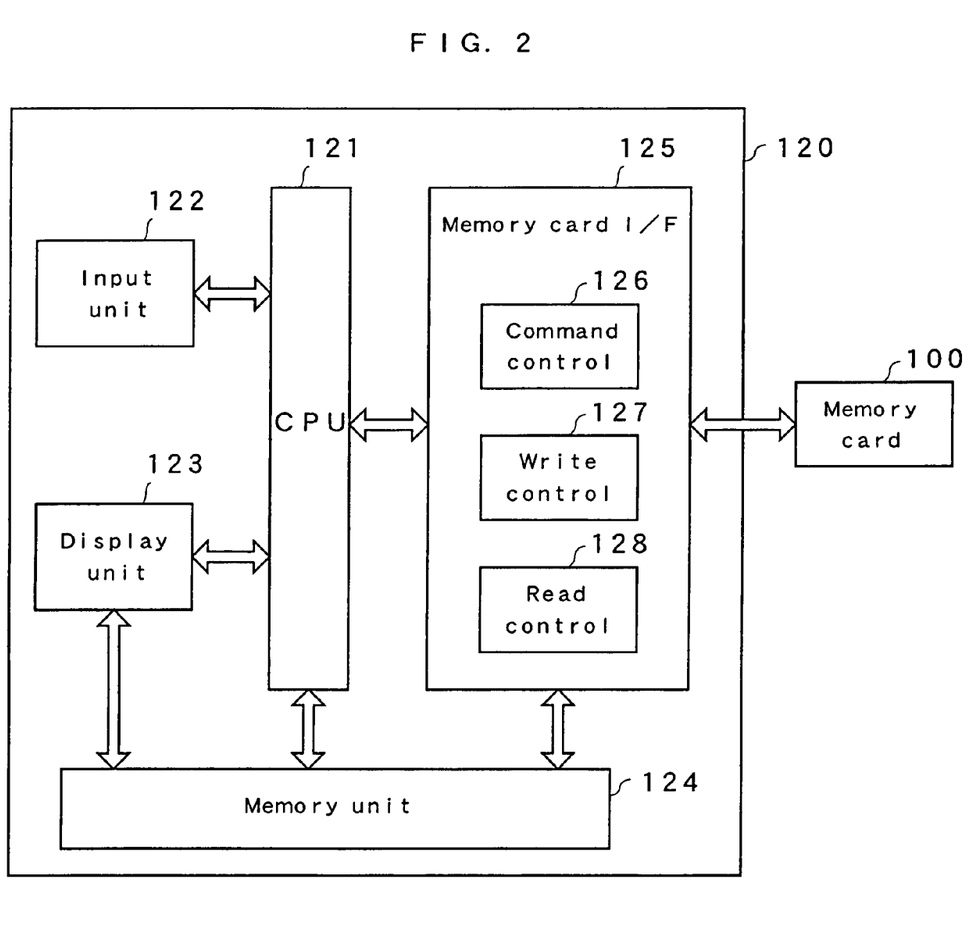
FIG. 2 is a block diagram showing the configuration of an access device according to the first embodiment of the present invention.

A first embodiment of the present invention will be described referring to the accompanying drawings. FIG. 1 is a block diagram showing one example of a nonvolatile memory device in a first embodiment of the present invention, and FIG. 2 is a block diagram showing one example of the access device in the first embodiment of the present invention.

In FIG. 1, a memory card 100A is the nonvolatile memory device and a access device 120 performs data reading and data writing on the memory card 100A. These memory card 100A and access device 120 compose a nonvolatile memory system. The memory card 100A includes a controller 101A and a flash memory 102 as a nonvolatile memory. In the controller 101A, a host I/F 111 provides an interface between the access device 120 and the controller 101A, and a flash I/F 112 provides an interface between the flash memory 102 and the controller 101A. A control circuit 113 controls each block inside the controller 101A to write data from the access device 120 into the flash memory 102 and to read data in the flash memory 102 to the access device 120. A page buffer 114 is a buffer that temporarily stores data transferred from the access device 120 and then written into the flash memory 102, or data read from the flash memory 102. In this embodiment, the page buffer 114 has a capacity of 2 kB (bytes). An ECC circuit 115 is an error correction circuit that, upon data writing from the access device 120 into the flash memory 102, adds the error correcting code calculated based on the write data, and that, upon data reading from the flash memory 102 to the access device 120, performs an error correction, by use of the ECC, on the data temporarily read to the page buffer 114. An ECC switch flag 116 is a flag that holds information for switching between an ECC-on mode in which data are read with correcting the error and an ECC-off mode in which data are read without ECC correction.

Next, the access device 120 will be described referring to FIG. 2. The access device 120 has a CPU 121 that controls the entire device, input unit 122, display unit 123, storage unit 124, and memory card I/F 125. The memory card I/F 125 has a command control part 126, write control part 127, and read control part 128, and controls an interface of the memory card. For example, in a case where this access device 120 is the digital camera, a shutter, operable button by the user, and CCD for inputting the image data serve as the input unit 122, and a liquid crystal panel serves as the display unit 123. The command control part 126 issues a command to the memory card 100A, and the write control part 127 is used as a control part for data writing into the memory card, and the read control part 128 is used as a control part for data reading therefrom.

When the access device 120 reads data from the memory card 100, the data are read from the memory card with the use of the command control part 126 and read control part 128 based on a data read program loaded in the CPU 121. When the access device 120 writes data into the memory card 100, the data are written into the memory card with the use of the command control part 126 and write control part 127 based on a data write program loaded in the CPU 121.

Figure 3:
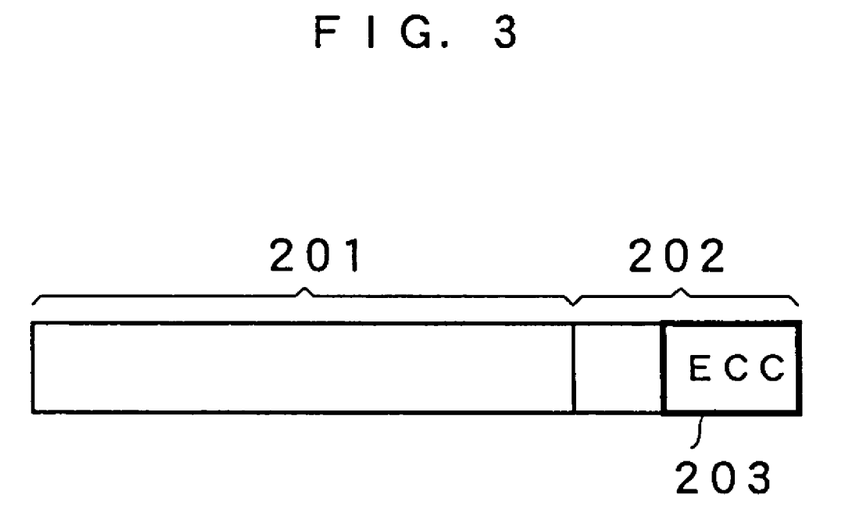
FIG. 3 is a data configuration diagram of a page of a flash memory in the first embodiment of the present invention.

The flash memory 102 is a nonvolatile memory that holds user data, and is composed of a large number of physical blocks as erase units. Each of the physical blocks is composed of a plurality of pages. FIG. 3 is a diagram showing the data configuration in a page unit as a unit of writing and reading in the flash memory 102. Each page is composed of a user data area 201 having a capacity of 2 kB (bytes), and management area 202 having a capacity of 64 B. The user data area 201 is an area where user data transmitted from the access device 120 is written directly without any correction. The management area 202 is an area where management information of user data is written, including an ECC 203 for performing error correction on user data. The user data is divided in units of user data areas (2 kB each) and then written into the flash memory 102. The unit of division is 2 kB in this embodiment, although not limited thereto. Thus, a typical unit of access from the access device 120, i.e., 512 Byte, or any other capacity of the unit may be used.

Figure 4:
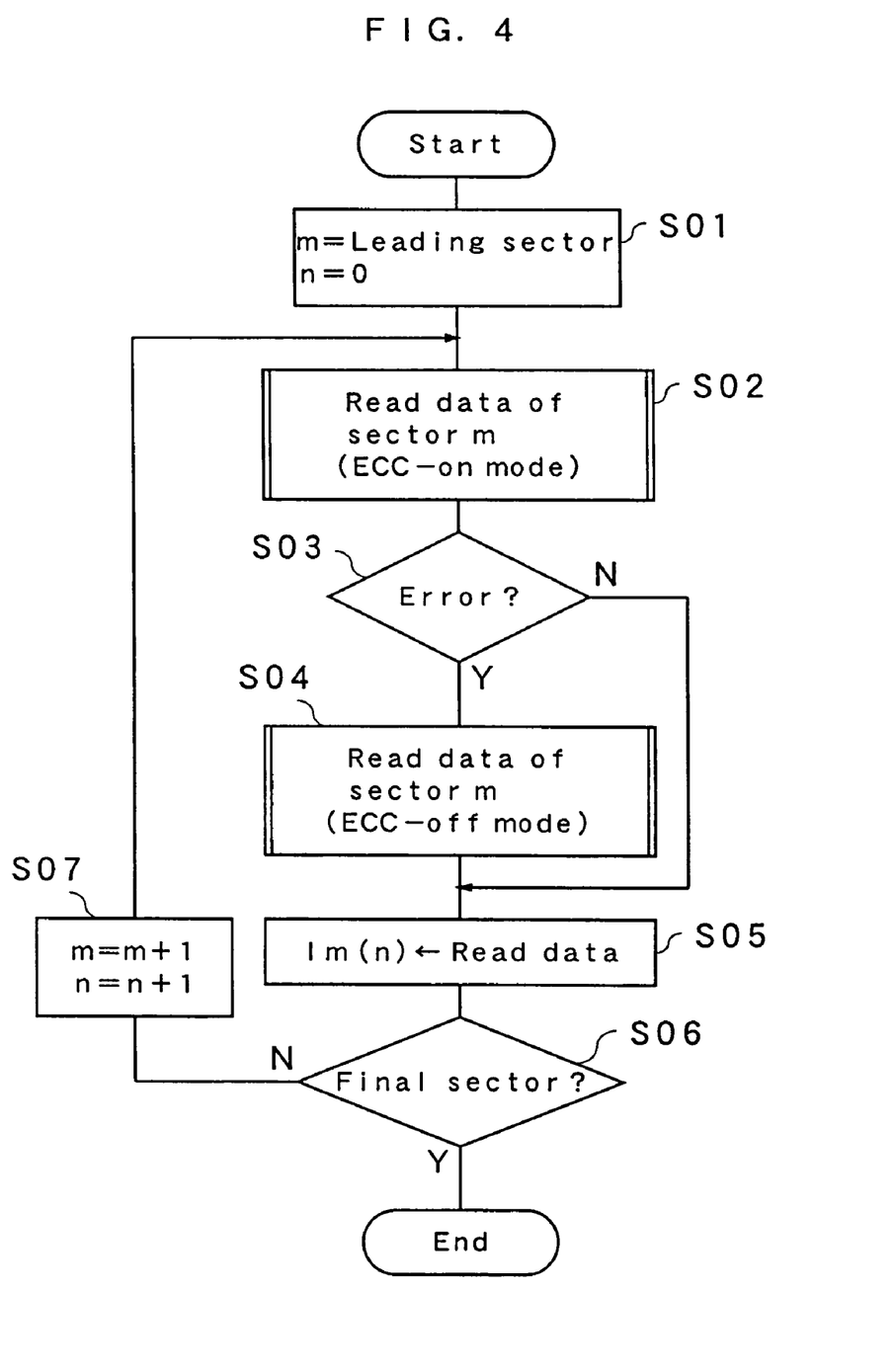
FIG. 4 is a flowchart showing data reading performed by the access device in the first embodiment of the present invention.
Figure 5:
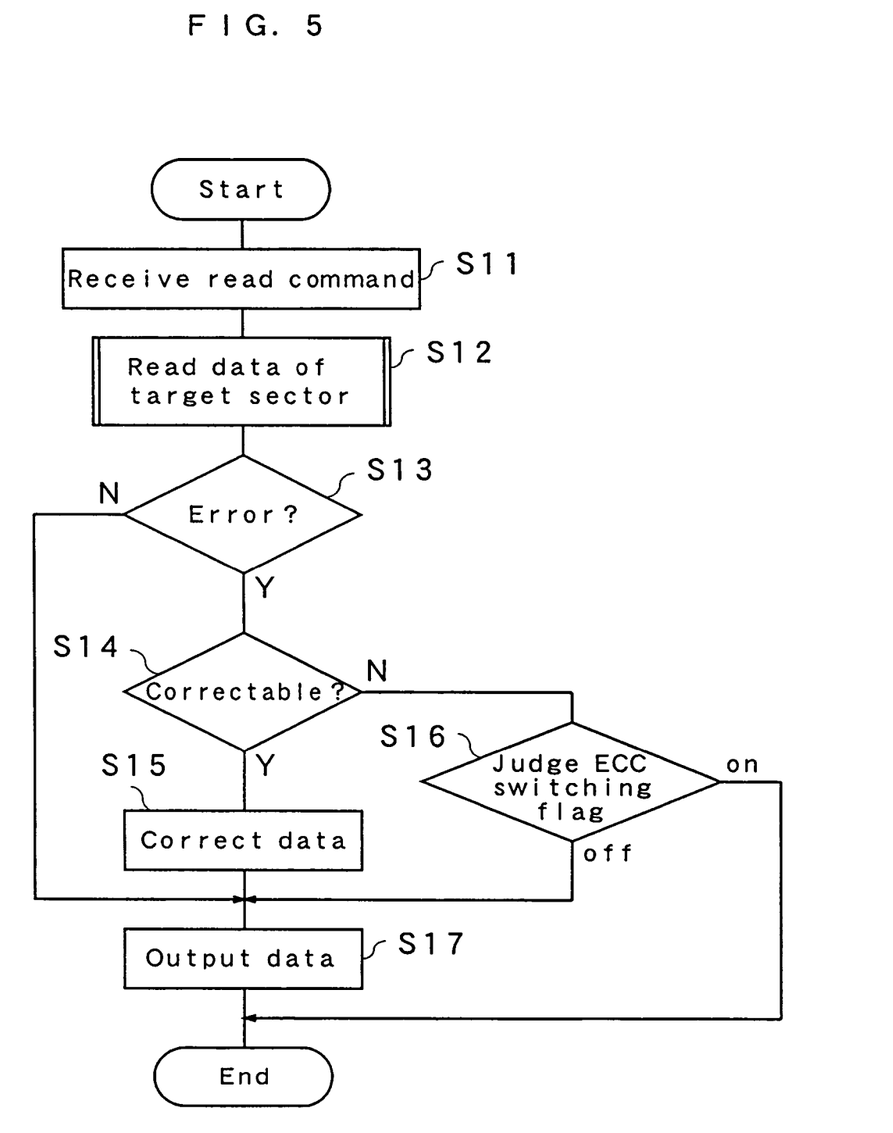
FIG. 5 is a flowchart showing data reading performed in a memory card in the first embodiment of the present invention.

First, a case where the access device 120 reads data from the memory card 100A will be described referring to FIGS. 4 and 5. FIG. 4 is a flowchart showing an operation performed by the access device 120, and FIG. 5 is a flowchart showing an operation performed by the memory card 100A. First, under the condition that the memory card 100A is connected to the access device 120 and then power of the memory card is turned on, the control circuit 113 sets the ECC switch flag 116 in the ECC-on mode, which is a standard condition. The access device 120 specifies a logical address and issues a read command to the memory card 100A. Here, the unit of reading data is a sector unit, and variables m and n are defined as variables in sector units. The sector may have the same capacity as that of the physical block described above, or may have a capacity different therefrom. First, in a step S01, the variable m is set at the leading sector of data to be read, and the variable n is set at 0. Next, in a step S02, data of the sector m is read in the ECC-on mode.

Meanwhile, the memory card 100A receives a read command from the access device 120 (step S11). The host I/F 111 notifies the control circuit 113 of receiving the read command and information of the logical address from the access device 120. The control circuit 113 determines the physical address of the flash memory 102 where data of this logical address is written, and notifies the flash I/F 112 of this information and a read execution command. The flash I/F 112 issues a read command to the flash memory 102. In this manner, the data is read from a target sector of the flash memory 102 (step S12). Some of the data in the user data area 201 is transferred to the page buffer 114 and ECC circuit 115. Subsequently, the flash I/F 112 transfers an ECC 203 included in the management area 202 to the ECC circuit 115 only. After the transfer is completed, the control circuit 113 obtains information concerning error from the ECC circuit 115 to judge whether or not there is any error (step S13). If there is no error, the data in the page buffer 114 is outputted directly to the access device 120 via the host I/F 111 (step S17). If there is any correctable error, the ECC circuit 115 corrects the error in the page buffer 114 (steps S14 and S15). Subsequently, the process proceeds to a step S17, and the data in the page buffer 114 is outputted to the access device 120 via the host I/F 111. In this manner, the access device 120 can read the data from the memory card 100A.

On the contrary, if there is any uncorrectable error, the control circuit 113 judges the ECC switch flag 116 in a step S16. Since this flag is initially set in the ECC-on mode, the read process is completed without any data output, so that the data in the page buffer 114 is not outputted to the access device 120.

On the contrary, the access device 120 determines, at a determination step S03 shown in FIG. 4, whether or not any uncorrectable ECC error occurs in the data of the sector m. That is, as described above, if data is outputted from the memory card 100A, it is determined that there is no error; if data is not outputted, the error is determined by inquiring the status for the memory card 100A.

The control circuit 113 of the memory card 100A informs via the host I/F 111 that an uncorrectable ECC error has occurred. Upon receiving this information, the access device 120 issues a correction disuse command for outputting the data without performing error correction to the memory card 100A. Upon receiving the command, the control circuit 113 sets the ECC switch flag 116 in the ECC-off mode in which data is read without performing error correction.

In this condition, the access device 120 issues the read command again in a step S04 in order to read the data that could not be read due to the error occurring therein. At the side of the memory card 100A, repeats the processes in the steps S11 to S14 of FIG. 5 are repeated in accordance with the read command issued by the access device 120, and then the ECC switch flag 116 is judged in the step S16. Since this flag shows the ECC-off mode, the control circuit 113 outputs the data in the page buffer 114 directly to the access device 120 via the host I/F 111 without correcting this data (step S17).

In this manner, the data can be outputted regardless of the presence or absence of the error. The access device 120 stores the last read data into an image file Im (n) in a step S05. Subsequently, the access device 120 determines at a step S06 whether or not the last processed sector is the final sector of the data to be read. If it is determined that the last processed sector is the final sector, the file acquisition process is ended. If it is judged that the last processed sector is not the final sector, the process shifts to a step S07. In the step S07, after incrementing the variables m and n, the process returns to the step S02 to repeat the same processes. Undergoing the process described above permits reading data in a complete form or incomplete form, thus permitting recognition of a sector including the error.

Figure 6A:
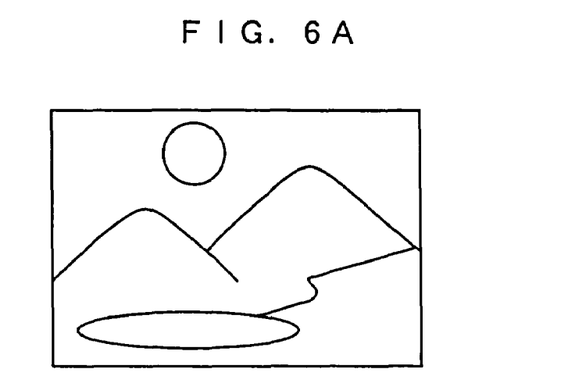
FIG. 6A is a diagram showing an image written in the flash memory.
Figure 6B:
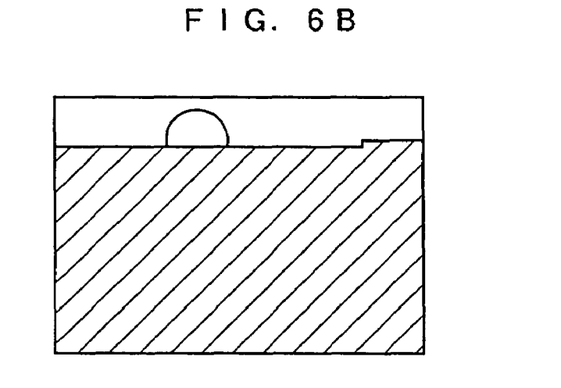
FIG. 6B is a diagram showing a read image when an error has occurred.
Figure 6C:
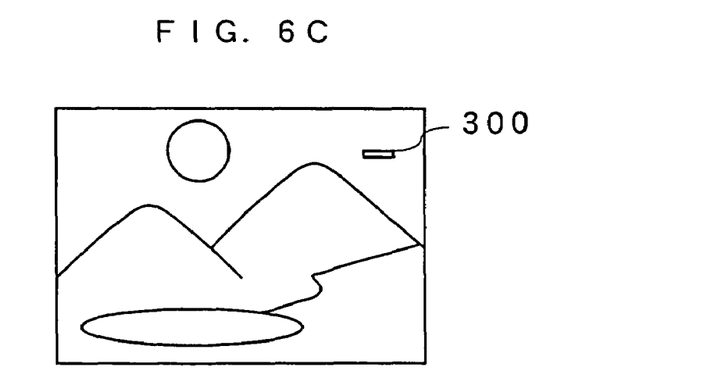
FIG. 6C is a diagram showing an image after the data reading in the first embodiment.

FIGS. 6A, 6B, and 6C are graphics showing effects of this embodiment. FIG. 6A shows error-free image data that is written in the flash memory. If a part of this image data is damaged due to the bit error, a conventional memory card permits reading only the data before the error has occurred. Thus, when displayed, this image is largely damaged, as shown in FIG. 6B. On the contrary, when the data is read regardless of the presence or absence of the error as in the present embodiment, even in a case where error correction cannot be performed on a portion with the error, only part of the image for example, a numeral 300 is damaged as shown in FIG. 6C and thus an image substantially close to the original image can be reproduced. In addition, if this data is data of the motion picture, even when the error occurs, which cannot be corrected, the image is disturbed for a moment, thus providing effect that an image substantially close to the original motion picture can be reproduced.

Second Embodiment

Figure 7:
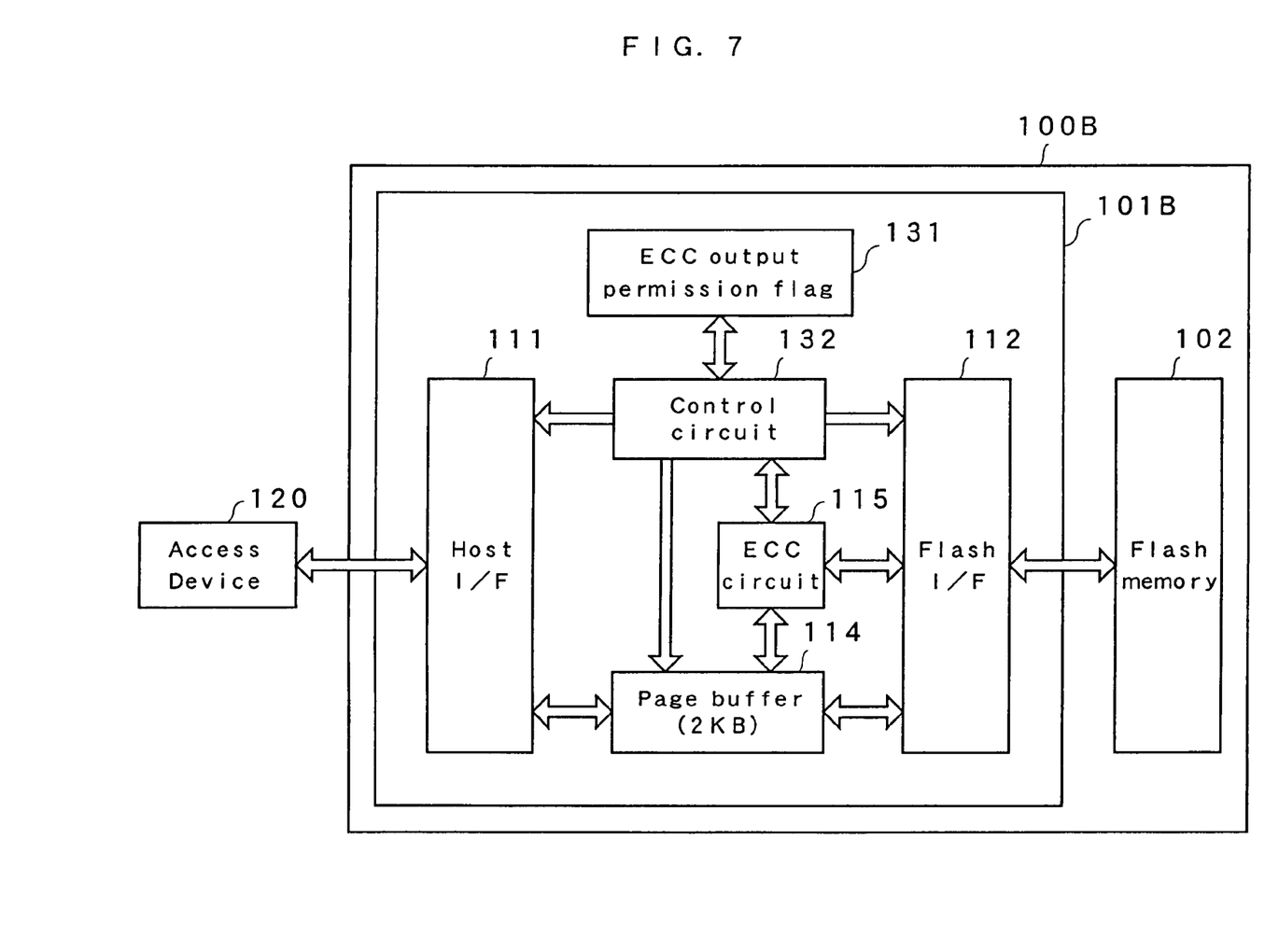
FIG. 7 is a block diagram of the nonvolatile memory device in a second embodiment of the present invention.

Next, a second embodiment of the present invention will be described. FIG. 7 is a block diagram showing the configuration of the nonvolatile memory device of this embodiment. Portions the same as those in the first embodiment are provided with the same numerals. In this embodiment, the nonvolatile memory device 100B is composed of a memory controller 101B and flash memory 102. In the memory controller 101B, an ECC output permission flag 131 is a flag that indicates switching between permitting and not permitting data output without performing error correction with the use of the error correcting code. A control circuit 132 holds programs for performing process to be described later. In this second embodiment, by setting the ECC output permission flag 131 to permit data output without adopting error correction with the ECC, the ECC correction is automatically performed before the data is outputted when an ECC correction function can be used in the memory card 100B, while the data is directly outputted without any correction when the correction with an ECC cannot be performed.

Figure 8:
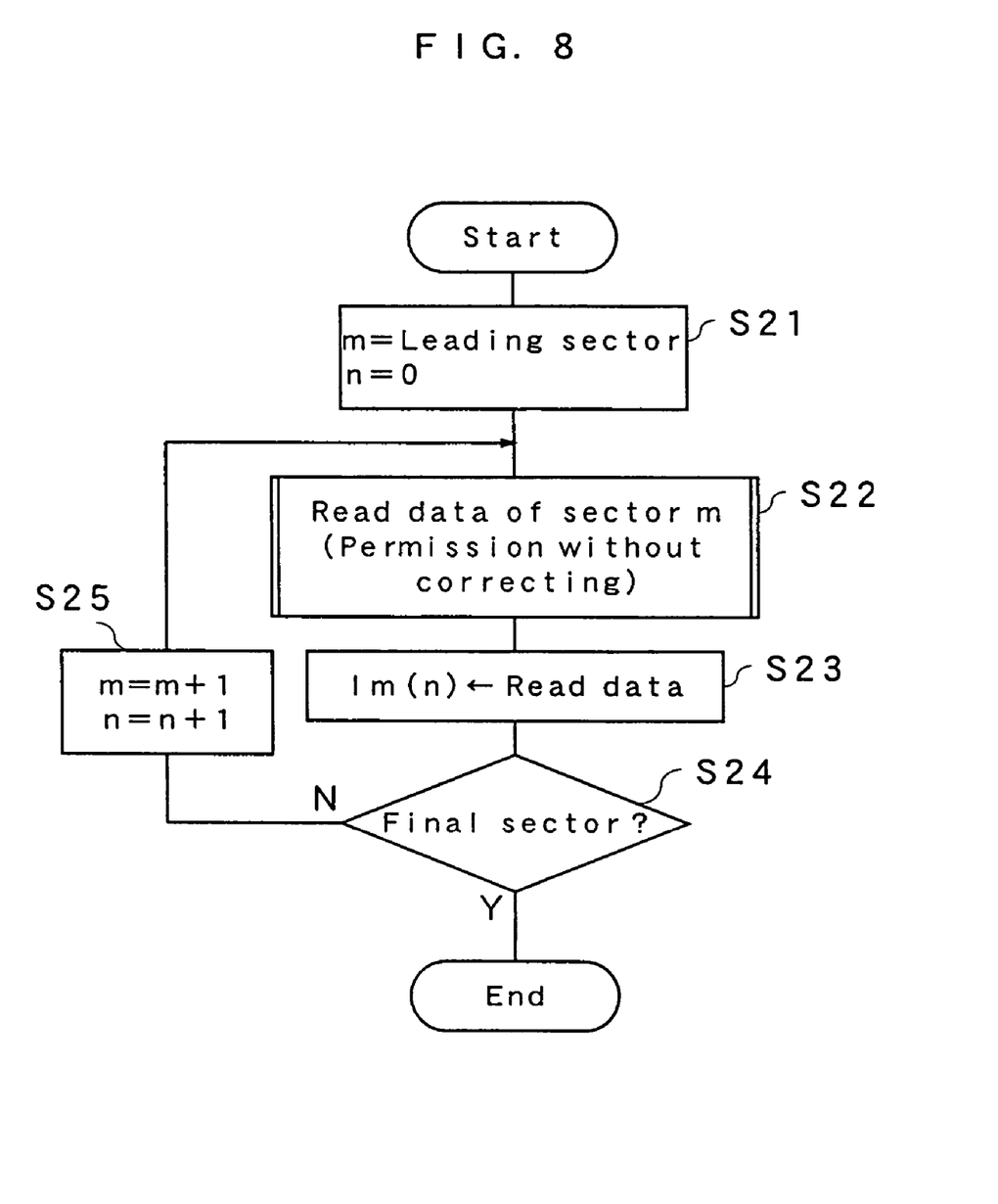
FIG. 8 is a flowchart showing data reading performed by the access device in the second embodiment of the present invention.

Next, an operation of the second embodiment will be described referring to flowcharts of FIGS. 8 and 9. In the data read processing performed by the access device, as shown in FIG. 8, to read data, first in a step S21, the access device 120 sets the variable m at the value of the leading sector of data to be read and sets the variable n at the value of 0. The variables m and n are variables for units of sectors. Next, in a step S22, the access device 120 reads data of a sector m. It is assumed here that reading without the error correction is permitted. Then, in a step S23, the read data of the sector m are stored into an image file Im (n). In a step S24, a determination whether or not a last processed sector is the final sector of the data to be read is performed. If it is determined that the last processed sector is the final sector, the data reading process is ended. If it is determined that the last processed sector is not the final sector, the process shifts to the step S25, where the variables m and n are incremented, and then returns to the step S22.

Figure 9:
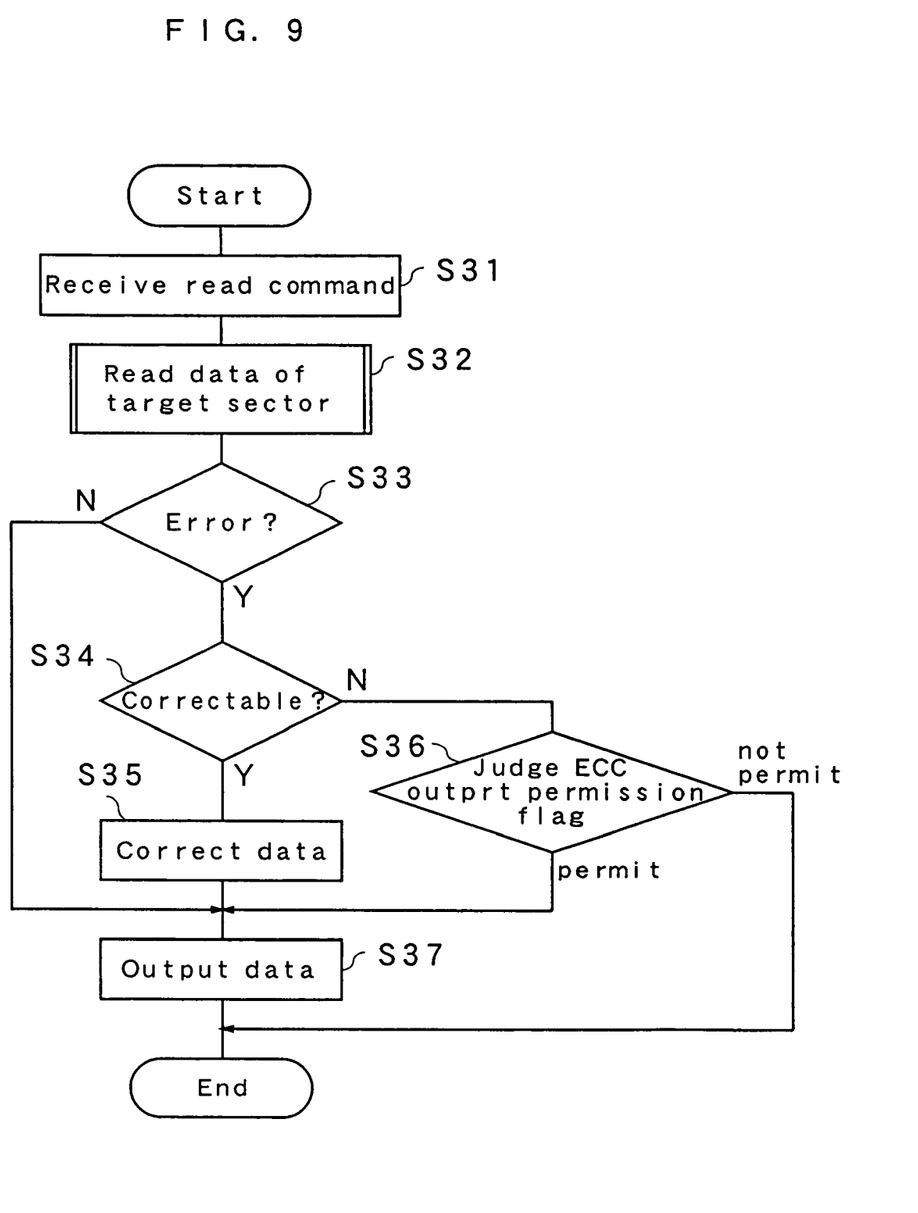
FIG. 9 is a flowchart showing data reading performed in the memory card in the second embodiment of the invention.

Meanwhile, as shown in FIG. 9, the memory card 100B receives the read command from the access device 120 (step S31). The host I/F 111 notifies the control circuit 132 of receiving the read command and information of the logical address from the access device 120. The control circuit 132 determines the physical address of the flash memory 102 where data of the logical address is written, and notifies the flash I/F 112 of the information and a read execution command. The flash I/F 112 issues the read command to the flash memory 102. In this manner, the data is read from the target sector of the flash memory 102 (step S32). Some of the data in the user data area 201 is transferred to the page buffer 114 and ECC circuit 115. Subsequently, the flash I/F 112 transfers the ECC 203 included in the management area 202 to the ECC circuit 115 only. After the transfer is completed, the control circuit 132 obtains information concerning the error from the ECC circuit 115 to judge whether or not there is any error (step S33). If there is no error, the data in the page buffer 114 is outputted directly to the access device 120 via the host I/F 111 (step S37). If there is any correctable error, the ECC circuit 115 corrects the error in the page buffer 114 (steps S34 and S35). Subsequently, the process proceeds to the step S37, and the data in the page buffer 114 is outputted to the access device 120 via the host I/F 111.

At a step S34, if there is any uncorrectable error, the process proceeds to a step S36. Then, referring to the ECC output permission flag 131, it is determined whether or not to permit outputting without any correction. When outputting without any correction is permitted, the process proceeds to a step S37 to output the data. When outputting without any correction is not permitted, the process ends without reading the data. If outputting without any correction is not permitted, the access device 120 operates in the same manner as the conventional memory card. If outputting without any correction is permitted, the access device 120 can read data from the memory card 100B in a complete or incomplete form.

The nonvolatile memory system, nonvolatile memory device, data read method, and data read program in the embodiments of the present invention can strongly read data from the same sector by having two types of read modes including a normal read mode in which the error correction is performed for reading and a special read mode in which the error correction is not performed for reading.

As described above, the data read method and data read program of the nonvolatile memory device according to the present invention are applicable to the nonvolatile memory devices for use in portable devices, such as the digital cameras, digital video cameras, and the like, that handle the still image data and motion picture data.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2005-067251 filed on 10 Mar. 2005 is hereby incorporated by reference.

What is claimed is:

1. A nonvolatile memory system comprising a nonvolatile memory device, and an access device that accesses said nonvolatile memory device to read user data in the nonvolatile memory device,
wherein said nonvolatile memory device includes:
a nonvolatile memory including a user data area into which user data are written and a management area which stores an error correcting code for performing error correction on the data written in said user data area; and
a controller including an error correction circuit for correcting an error in user data read from said nonvolatile memory based on the error correcting code stored in said management area, which includes: an error correction read in which user data is read from said nonvolatile memory and the error correction is performed with the use of said error correction circuit if there is any error while the data is directly read if there is no error; and a raw data read in which the user data read from said nonvolatile memory is directly outputted without any correction, and
wherein said access device reads user data in combination with said error correction read and said raw data read from the nonvolatile memory device.

2. The nonvolatile memory system according to claim 1, wherein, to read the user data, said access device uses said error correction read by directing said nonvolatile memory device, and makes switching to the raw data read when said error correction cannot be performed.

3. The nonvolatile memory system according to claim 1, wherein, in the user data reading with the use of said error correction read, based on that no data is outputted from said nonvolatile memory device, said access device determines that an correctable error by said error correction circuit has occurred.

4. The nonvolatile memory system according to claim 2, wherein said controller has a flag for identifying whether or not to perform correction with the use of an error correcting code, and based on said flag, makes switching between said error correction read and said raw data read.

5. A nonvolatile memory device comprising:
a nonvolatile memory having a user data area into which user data is written and a management area which stores error correcting code for performing an error correction on data written in said user data area; and
a controller including an error correction circuit for correcting error in user data read from said nonvolatile memory based on said error correcting code,
wherein said controller comprises:
a normal read mode wherein data in the user data area is directly outputted if there is no error, the error in the data in the user data area is corrected and then outputted, if there is any correctable error, and data is not outputted if there is any uncorrectable error; and
a special read mode wherein data in the user data area is outputted directly if there is no error, the error in the data in the user data area is corrected and then outputted, if there is any correctable error, and data in the user data area is directly outputted without any correction if there is any uncorrectable error.

6. The nonvolatile memory device according to claim 5, wherein said controller has the flag for identifying whether or not to permit data output without use of the error correction, and makes switching between said normal read mode and said special read mode based on a value of said flag.

7. The nonvolatile memory device according to claim 5, wherein said flag is switched from outside said nonvolatile memory device.

8. A data read method for reading user data from a nonvolatile memory device which comprises:

a nonvolatile memory having a user data area into which the user data is written and a management area which stores error correcting code for performing an error correction on the data written in said user data area; and a controller including an error correction circuit for correcting error in user data read from said nonvolatile memory based on the error correcting code stored in said management area, comprising:

reading user data from said nonvolatile memory;

determining presence or absence of the error in the user data read from the nonvolatile memory;

directly outputting data if there is no error in the user data;

outputting data after subjecting the data to the error correction with the use of said error correction circuit if there is any error; and directly outputting user data read from said nonvolatile memory without any correction if the error cannot be corrected with the use of said error correction circuit.

9. A data read program for reading user data from a nonvolatile memory device which comprises:

a nonvolatile memory having a user data area into which the user data is written and a management area which stores error correcting codes for performing an error correction on the data written in said user data area; and a controller including an error correction circuit for correcting errors in the user data read from said nonvolatile memory based on the error correcting code stored in said management area, comprising:

reading user data with the use of a normal read mode in which said controller corrects the error in the user data read from said nonvolatile memory with the use of said error correction circuit and outputs the data to an outside of said nonvolatile memory device, and reading user data with the use of an ECC-off read in which said controller directly outputs the user data read from said nonvolatile memory to an outside of said nonvolatile memory device without the use of said error correction circuit, when the error which cannot be corrected by said error correction circuit occurs in said nonvolatile memory and it is judged that the reading cannot be achieved by said normal read mode.

10. The data read program according to claim 9, wherein said normal read and said ECC-off read are used by switching in a sector unit.

11. The data read program according to claim 9, wherein, in reading with the use of said normal read, when no data from said nonvolatile memory device is outputted, it is judged that the error which cannot be corrected by said error correction circuit occurs in said nonvolatile memory and the data cannot be read by said normal read.

12. A data read program for reading user data from the nonvolatile memory device which comprises:

a nonvolatile memory having a user data area into which the user data is written and a management area which stores error correcting codes for performing an error correction on the data written in said user data area; and a controller including an error correction circuit for correcting errors in user data read from said nonvolatile memory based on the error correcting code stored in said management area, comprising:

reading user data from said nonvolatile memory by a special read which outputs: user data from said nonvolatile memory after correcting the user data when an error in user data is correctable; and row data read from said nonvolatile memory when the error is not correctable.

* * * * *